United States Patent [19]

Regipa

[11] Patent Number: 4,770,374

[45] Date of Patent: Sep. 13, 1988

[54] METHOD AND EQUIPMENT FOR DEPLOYING AN ENVELOPE AROUND AN OBJECT, IN PARTICULAR A SATELLITE

[75] Inventor: Robert Regipa, Toulouse, France

[73] Assignee: Centre National d'Etudes Spatiales (C.N.E.S.), Paris, France

[21] Appl. No.: 35,576

[22] Filed: Apr. 7, 1987

[30] Foreign Application Priority Data

Apr. 8, 1986 [FR] France ................... 86 05097

[51] Int. Cl.⁴ ............................................. B64G 1/10
[52] U.S. Cl. ............................................. 244/158 R
[58] Field of Search ........................... 244/158 R, 159

[56] References Cited

FOREIGN PATENT DOCUMENTS 1485587 6/1967 France ........................ 244/158 R Primary Examiner—Galen Barefoot
Assistant Examiner—R. Corl
Attorney, Agent, or Firm—Harold H. Dutton, Jr.

[57] ABSTRACT

A method for deploying an airtight envelope (8) around an object (1) comprising providing a cylindrical, elongated envelope with two mutually opposite poles (3, 9) at each of its ends, inverting this envelope on itself and longitudinally pleating it accordion-wise when in this inverted position, the pole (9) of this envelope (8) being in the inverted part and being solidly joined to the object (1), the opposite pole (3) being connected to the object (1) by a link mast (2) comprising a cylindrical balloon initially in the deflated state, the deployment of the envelope (8) comprising inflating the link mast until it is full, then inflating the envelope (8) until it is full and at which time it will be deployed around the object (1).

17 Claims, 6 Drawing Sheets

METHOD AND EQUIPMENT FOR DEPLOYING AN ENVELOPE AROUND AN OBJECT, IN PARTICULAR A SATELLITE

The invention relates to a method for deploying an airtight envelope around an object. The invention also relates to equipment for carrying out the method.

BACKGROUND AND OBJECTS OF THE INVENTION

At present when an envelope tied by one of its poles to a structure is being deployed, the deployment is carried out such that the envelope extends totally along the structure. Accordingly only the side of the structure connected to the pole will be protected by this envelope. In the same manner, accessibility inside the volume bounded by this envelope is only through one side of this structure.

The present invention provides a method to automatically deploy an airtight envelope around an object, in particular an object subjected to comparatively low aerodynamic stresses, for instance an orbiting satellite.

Another object of the invention is to put a rigid structure radially around an object.

Another object is to provide compact and reduced-weight equipment which can be easily transported to carry out the above method.

DESCRIPTION OF THE INVENTION

The method of the invention for deploying an airtight envelope around an object comprises, in a preliminary stage, enclosing the object in an airtight but deflated envelope, connecting one zone, (called the pole) of this envelope with the object by a connecting mast capable of presenting two end positions, whereby in one collapsed end position the mast keeps the envelope pole substantially against the object, and whereby in the other extended end position the mast keeps the envelope pole away from and across the object, the connecting mast initially being in its collapsed position, and in a subsequent deployment stage, causing the mast is made to move from its collapsed into its extended position, and inflating the envelope until full.

Accordingly this method makes it possible to deploy automatically and at any time an airtight envelope around an object. In this application, on-board inflating means may be used which can fully inflate the envelope.

Moreover, when full, the envelope will be centered about the object due to the connecting or linking mast and therefore its reactions will be the same as those of the object.

However, to provide access to the object and to prevent degrading the envelope prior to the deployment stage, the method preferably includes in its preliminary stage the use of an inner envelope of elongated shape with two opposite poles at each end, the envelope being inverted on itself and accordion-pleated in this folded-back position, to fix the envelope pole that is located in the inverted part onto the object and to connect the other envelope pole to the object by a link mast having a length less than the envelope and being collapsed.

By using an envelope inverted on itself and then accordion-pleated in the longitudinal direction, it is possible to deploy the envelope around the object when at the start the envelope is wholly located on one side of that object.

Therefore the envelope and the link mast can be initially integrated inside a container protecting them. Also only one object zone is blocked by the presence of the inverted envelope and hence it is possible to work on the object until the envelope is deployed.

It will be noted that this deployment can only be activated when the aerodynamic stresses on the object are comparatively weak. This is the case in particular for an orbiting satellite or missiles moving at low altitude above ground.

The inner envelope preferably has a generally elongated cylindrical shape with a cross-section exceeding that of the object so it may slide along the object. Also, in another feature of the invention, this envelope may be associated with a second envelope, in which case the method comprises: (a) during the preliminary stage, using a second, external envelope of larger volume than the inner one and having an open annular pole, partly slipping the external envelope, while pleating it, around the inner envelope before the latter is folded so that the annular pole of the external envelope is fixed on the periphery of the inner envelope a distance from its poles, the other pole of the external envelope being part of the inner envelope pole which will be fastened to the link mast, inverting, then longitudinally folding in accordion-manner the two envelopes so associated with each other, fixing one of the poles of the inner envelope on the object and linking the common pole of the inner and outer poles to the object by means of the link mast which is in its collapsed position, (b) during the deployment stage driving the link mast to extend, inflating the inner envelope until full when it is deployed around the object, continuing to inflate until the outer peripheral wall of the inner envelope ruptures, inflating the external envelope until this envelope is filled.

This external envelope allows subtending a much larger volume around the object. As will be seen further below, moreover, it enables a protected volume with the object at its center, where this volume is accessible from all sides of the object.

As a rule the inner envelope can be ruptured by using a cylindrical envelope surrounded by a grid of circumferential reinforcements distributed across the height of this shape so as to impart to it a lobe structure.

Beyond a given relative pressure, the envelope lobes will rupture and thereby will allow rapid inflation of the external envelope without the need for high-pressure gas jets.

The link mast in turn may include an elongated balloon having one pole fixed on the object and one pole in common with the common poles of the inner and external envelopes. It is necessary to emphasize the basic significance of this connecting balloon which, by its presence, makes it possible to achieve the equilibrium shape of the inverted inner envelope at which it is deployed around the object. Without the connection balloon, this inner envelope would deploy entirely in the extension of the object.

This connecting balloon is subjected to high stresses and preferably has an elongated cylindrical shape, further it is provided with a grid of circumferential reinforcements.

This connection balloon moreover is provided with an interpolar link extending axially between the poles of this balloon. In this manner it is possible to inflate this balloon until its external envelope ruptures, the interpolar link then absorbing the tensional stresses to which the balloon is subjected.

Eliminating this balloon offers the advantage of accessibility to the inside volume defined by the external envelope. To make this access possible from any of the object sides, even all of the inner envelope may be destroyed. However, before this destruction takes place, a hermetic polar part is placed at the open annular pole of the external envelope.

Accordingly these diverse steps make possible to erect a radial structure around the object which is accessible from all object sides. This large-volume structure in particular may constitute a work space wherein a satellite may be the core and may provide working conditions sheltered from the ambient.

In another feature of the invention, a rigid structure may be created by using an external double-walled envelope, a stiffening foam being injected between its walls. In this case the poles of the envelope may be connected to two mutually opposite sides of the object by two rigid masts operable both in compression and tension and thereby absorbing the stresses applied to the achieved structure.

The present invention also relates to apparatus to be fixed to an object for carrying out the above described method. This apparatus includes a container to be fixed to the object and containing a connecting mast having one end solidly joined to the container and adapted to be able to present two extreme positions: a collapsed position where it is folded inside the container, a deployed position where it extends outside the container; a first cylindrical, inner envelope having one pole solidly joined to the container and one pole solidly joined to the end of the connecting mast, the inner envelope being accordion-pleated within the container into a position inverted on itself, a second outer envelope partly slipped around the inner envelope before same is being folded and having an annular open pole solidly joined to the peripheral wall of the inner envelope and a pole solidly joined to the end of the connecting mast, inflating means designed to implement the consecutive inflation of the inner and of the outer envelopes.

DESCRIPTION OF THE DRAWINGS

The invention outlined in its generalities above will be more clearly understood from the detailed description below and in relation to the accompanying drawings showing in illustrative and non-restrictive manner a preferred embodiment, which drawings are an integral part of the present description.

DESCRIPTION OF THE PREFERRED EMBODIMENTS

Figure 1A:
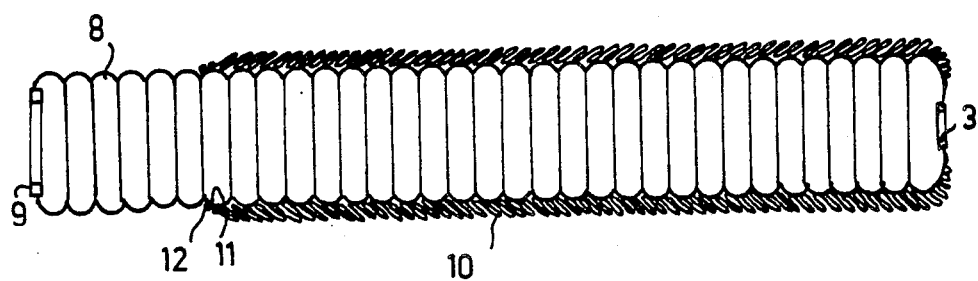
FIGS. 1a, 1b and 1c illustrate schematically the way the envelopes are folded in carrying the method of the invention.

This method requires, in the first case, a balloon 2, called the connecting balloon, which is made by assembling rectangular gores in any known manner, illustratively as described in the applicant's French patent application No. 80.00343. Accordingly this balloon includes a cylindrical portion extending into puckered ends of which the edges are fastened to polar parts 3 and 4 located on the axis and at the poles of the balloon.

The material is an airtight composite, for instance with a polyester filling yarn in the circumferential direction and a KEVLAR warp yarn in the longitudinal direction. As a result the material evinces asymmetrical strength which is higher longitudinally than circumferentially.

This balloon is enclosed by a grid of circumferential reinforcements 5 and longitudinal reinforcements 6. Each of these reinforcements is made of a high-strength, non-stretch material, for instance KEVLAR.

The polar parts 3 and 4 also are linked by a non-stretch interpolar link 7 extending along the balloon axis. This link 7 also may include a harness of high-strength, non-stretch strips, for instance made of KEVLAR.

The structure of this balloon 2 is that described in applicant's French patent application No. 84.18798 and allows inflating to high overpressures, the tensional stresses being absorbed by the interpolar link 7, the longitudinal grid 6 and the circumferential grid 5.

Next, the method of the invention requires an envelope 8, the inner envelope, which has a volume and a length exceeding those of the connecting balloon 2. This first envelope 8 is manufactured similarly to the connecting balloon by assembling rectangular gores. These gores are joined and fastened at their ends to one of the polar parts 3 of the connecting balloon 2 and at their opposite ends to another polar part 9.

Except for the eliminated interpolar link 7, this first envelope 8 is of the same structure as the connecting balloon 2.

Lastly, the method of the invention requires a second envelope 10, called the external envelope, having a volume larger than that of the first envelope 8. This envelope 10 also is manufactured similarly to the connecting balloon 2 by assembling rectangular gores This outer envelope 10 is partly slipped around the inner envelope 8. One of the constituent gore ends then is fixed on the polar part 3 common both to the connecting balloon 2 and to the inner envelope 8.

This external envelope 10 is then longitudinally pleated until the opposite gore end is away from the poles 3, 9 of the inner envelope 8 opposite a circumferential reinforcing zone 11 of this inner envelope. The gore end then is fastened to this reinforced zone 11 by any known means such as sewing or heat-sealing. Finally the assembly is strengthened by circumferential reinforcements 12, for instance KEVLAR cables, which act as hoops for this assembly.

Figure 1B:
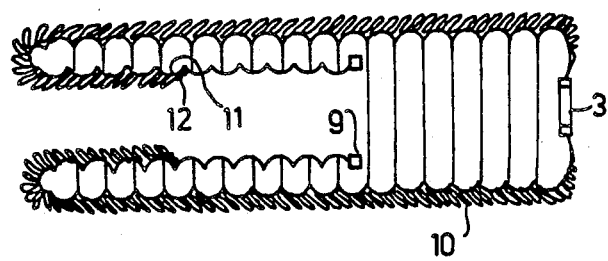
Figure 1C:
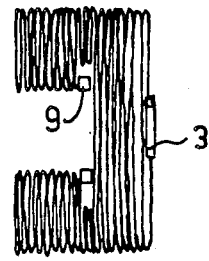

The inner and external envelopes 8 and 10 being thus combined (FIG. 1a), the inner envelope 8 then is inverted on itself (FIG. 1b), and thereupon these two envelopes are accordion-pleated longitudinally while observing the inverted position of the inner envelope (FIG. 1c). The connecting balloon 2 is folded longitudinally in conventional manner.

The assembly including the connecting balloon 2 and the inner and outer balloons 8 and 10 then is integrated inside a container 13. The respective poles 4, 9 of the connecting balloon 2 and of the inner envelope 8 are solidly joined to one of the walls of this container 13.

It should be noted that the expression "container" means any compartment suitable to house the connecting balloon and the two envelopes. This compartment may be a separate component to be fixed on the object or a component such as a large locker directly within the object.

This container 13 also holds inflating means (not shown) for the connecting balloon 2 and the two envelopes 8, 10.

The inflating means is provided with supply means communicating with the inside of the connecting balloon 2 and providing compressed air from a turbo-compressor (or any other equivalent source) through a conduit.

Monitoring means are associated with these inflating means to measure the relative pressure inside the connecting balloon 2. These monitoring means further are designed to trigger, relative to a given reference pressure, a sequencer controlling the closure of a conduit feeding the connecting balloon 2 and the opening of a tapping conduit communicating with the inside of the inner envelope 8.

The various features of the balloon 2, of the envelopes 8, 10 and of the inflating means having been described, the discussion below will cover the sequence in which these envelopes will deploy around an object 1 with reference to FIGS. 2 through 7.

The connecting balloon 2 and the two envelopes 8, 10 are housed when deflated within the container 13 which will be fastened to one side of the object 1. One of the poles 4, 9 of the connecting balloon 2 and of the inner envelope 8 respectively is solidly joined to one of the walls of the container 13, as already mentioned above.

It should be noted that this container 13, which also holds the inflating means, is comparatively compact and lightweight considering the compactness of the various envelopes when deflated.

Figure 2:
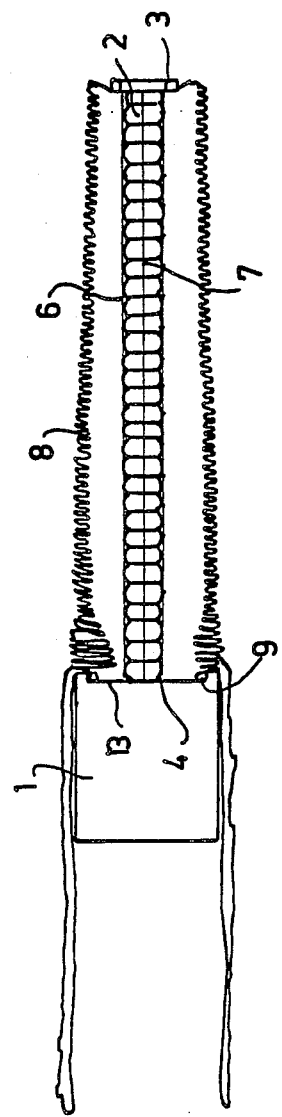
FIGS. 2, 3, 4, 5, 6, and 7 are schematic cross-sectional views illustrating the steps in the deployment of an airtight envelope around an object in accordance with the invention.

In the first phase, the inflating means inflate the link mast 2 until it is full and deployed in the extension of the object 1. In this full state, this connecting balloon 2 makes it possible to keep the common pole 3 of the inner and external balloons 8 and 10 away from the object 1 (FIG. 2).

Beyond a given reference pressure, the sequencer associated with the inflating means interrupts the air supply to this balloon 2 and causes the filling of the inner envelope 8.

As the filling takes place, that part of the inner envelope 8 in the extension of the object 1 inflates first until full. In a second stage and because of its inverted position and the presence of the connecting balloon 2, this inner envelope 8 deploys along the object 1 and finally in the extension of that side of the object which is opposite the balloon 2.

It should be noted that the cross-section of this inner envelope 8 must be larger than that of the object so as to allow sliding this envelope along this object 1.

Figure 3:
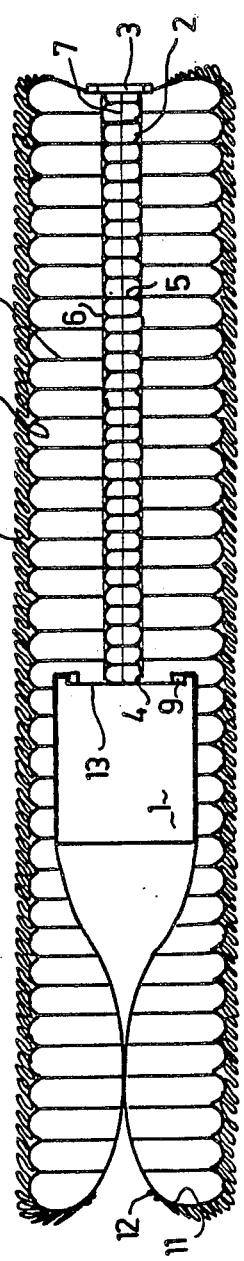

When the inner envelope 8 is filled, it will therefore be deployed around the object 1 (FIG. 3).

Figure 4:
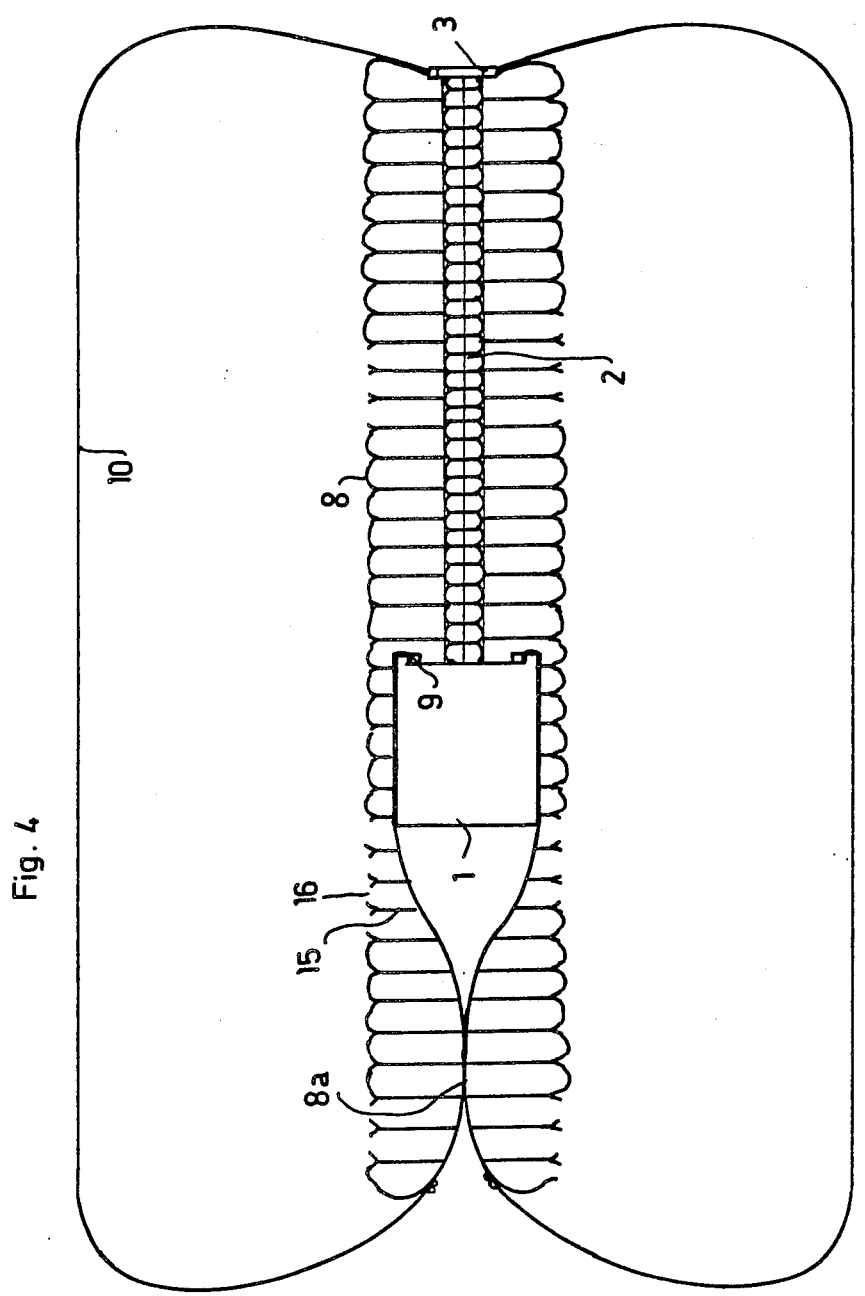
Figure 5:
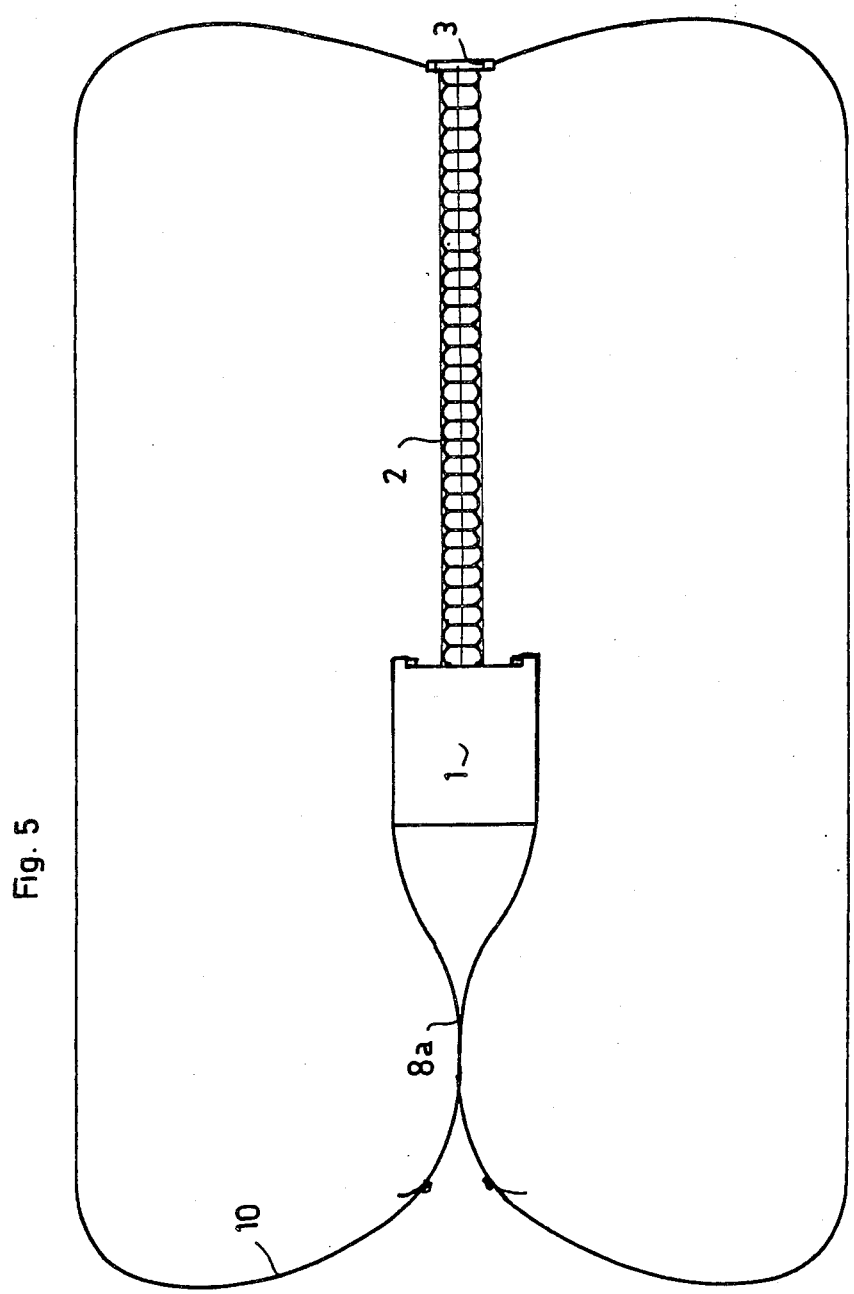

Thereupon inflation continues until the lobes between the circumferential reinforcements 15 of this envelope have been ruptured. Then the external envelope 10 is rapidly inflated by means of the air circulating in the openings 16 released by the rupture of the lobes until it is entirely filled (FIG. 4).

At that time the tensional stresses applied to this deployed structure are absorbed by the connecting balloon 2 endowing this assembly with good tensional and flexural strength. It should be noted that this connecting balloon 2 then may be replaced by a collapsing, rigid link mast.

The destruction of the inner envelope 8 thereafter may continue until the outer part of this envelope has been made to disappear entirely. In that case only the part 8a connecting the object 1 to the pole of the external envelope and opposite the connection balloon 2 (FIG. 5) remains.

Figure 6:
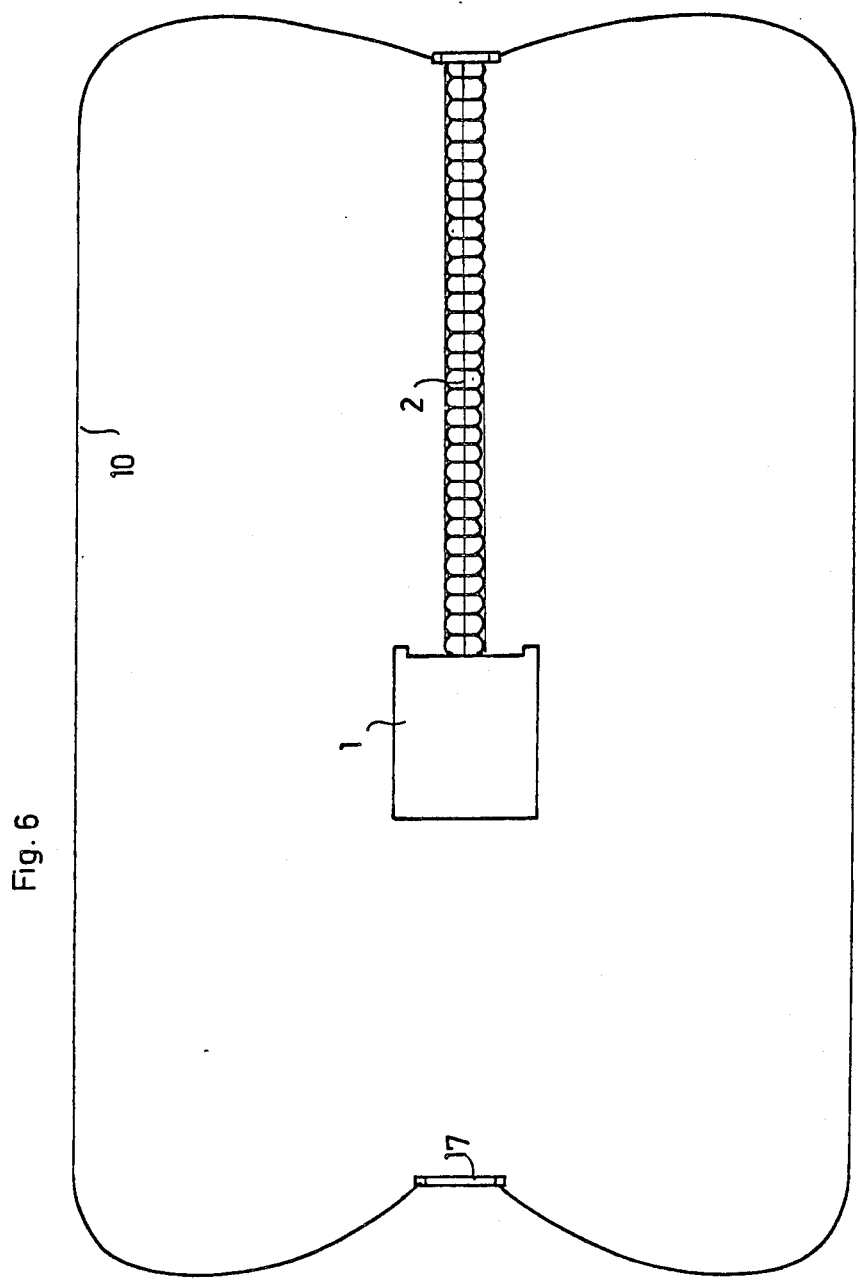
Figure 7:
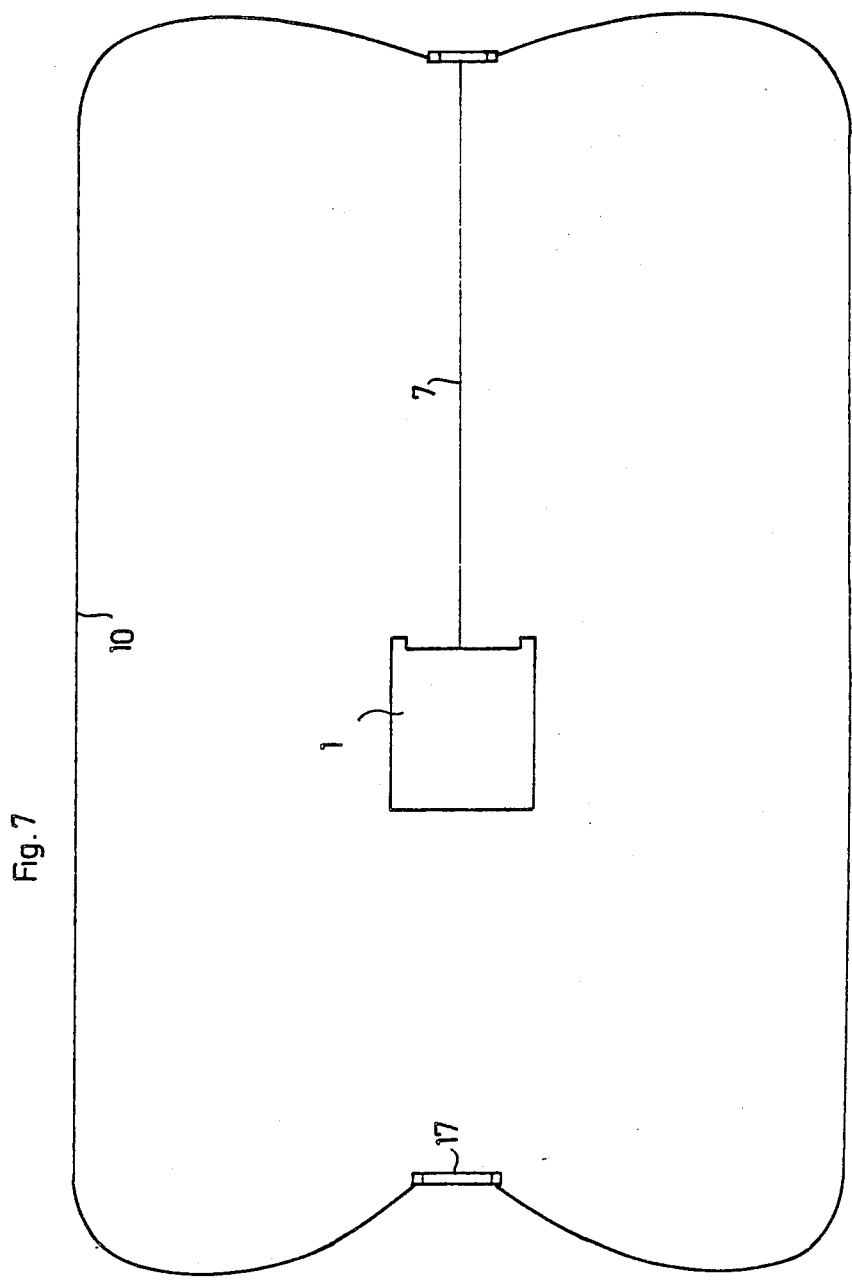

Thereafter, to clear the volume taken up by this latter part 8a of the inner envelope 8, the above-cited pole of the external envelope 10 is provided with a hermetic pole piece 17 to seal the structure, and the inner envelope 8 is then destroyed totally (FIG. 6).

Lastly the entire volume around the object will have been cleared by inflating the link mast 2 till the lobes between the circumferential reinforcements 5 have ruptured. Thereupon the interpolar link 7 of this connecting balloon 2 (FIG. 7) will absorb the tensional stresses and assure the rigidity of the structure.

The final structure obtained in this manner therefore is a radial structure deployed around the object. Also, this volume is accessible from all object sides.

The external envelope 10 of this structure also can be made more rigid by resorting to a double-walled envelope and by injecting a stiffening foam into the space between these two walls.

The later approach makes it possible to have a volume within which there will be no overpressure at all provided that two rigid masts be put in place which connect each pole of the external envelope to one object side.

While this invention has been described as having preferred features and embodiments, it will be understood that it is capable of still further modification and adaptation within the spirit of the invention, and this application is intended to cover all variations, adaptations, modifications and alternatives as may fall within the spirit of the invention and the scope of the appended claims.

I claim:

1. A method for deploying an airtight envelope around an object (1) comprising in a preliminary stage enclosing the object (1) with an airtight inner envelope (8) in a deflated state, said inner envelope having an elongated shape between two opposite polar zones, inverting said envelope on itself and longitudinally folding said inverted inner envelope in an accordion fashion, providing a link mast extendible between a collapsed position and an extended position, connecting one polar zone of said inner envelope to the object by means of said link mast in said collapsed position and thereby keeping said polar zone of said envelope against the object, connecting the other polar zone of said inner envelope to the object, said link mast in said collapsed state having a length less than said inner envelope, and in a deployment state extending said link mast to said extended position and inflating said inner envelope until substantially full.

2. A method as in claim 1, and wherein said inner envelope (8) has a generally elongated cylindrical shape with a cross-section larger than that of the object so as to permit slipping it over said object (1).

3. A method as in claim 2, wherein said preliminary stage includes providing a second external envelope (10) having a volume larger than the inner envelope and two poles, one at each of its ends, one of said poles being open and annular, partially slipping the external envelope (10) over the inner envelope (8) while being folded so that the annular pole of said external envelope (10) is fixed on the periphery of the inner envelope (8) away from its poles (3, 9), the other external envelope pole being common with the pole (3) to be fixed on the link mast (2) and belonging to the inner envelope (8), the two envelopes (8, 10) so combined being inverted and then longitudinally folded back accordion-wise, one of the poles (9) of the inner envelope being fastened on the object and the common pole (3) of the inner and external envelopes (8, 10) being connected to said object by said link mast (2) in its collapsed position, and in the deployment stage said link mast (2) is extended so that the inner envelope (8) is inflated until full so that said inner envelope is deployed around the object (1), and upon continued inflation the outer peripheral wall of the inner envelope (8) is ruptured, and the external envelope (10) is inflated until full.

4. A method as in claim 3, including providing said cylindrical inner envelope (8) within enclosing grid of circumferential reinforcements (15) distributed over its height so as to impart to it a lobe-shape, the rupture of said envelope being achieved by rupturing the lobes between the circumferential reinforcements.

5. A method as in claim 3 and including providing said inner envelope (8) with a reinforced circumferential zone (11) away from its poles (3, 9) the annular pole of the external envelope (10) being assembled to said reinforced zone of the inner envelope (8), and said assembly being hooped by circumferential reinforcements (12).

6. A method as in claim 3, and wherein said link mast (2) includes an elongated balloon having a pole (4) fixed one the object and a pole (3) common with the common poles of the inner and external envelopes (8, 10).

7. A method as in claim 6, wherein said balloon comprises as elongated cylindrical connecting balloon (2) having a high-strength envelope provided with a grid of circumferential reinforcements.

8. A method as in claim 6 and wherein said inner balloon has an interpolar link (7) extending axially between the poles (3, 4) of said inner balloon and inflating this balloon until its envelope ruptures.

9. A method as in claim 3, and wherein following inflation of the external envelope (10), a hermetic polar part (17) is fastened at the open annular pole of said external envelope and in that all of the inner envelope (8) is destroyed.

10. A method as in claim 8, and wherein a double-wall external envelope (10) is used and in that following inflation of said envelope a stiffening foam is injected into the space between said walls in order to create a rigid structure around the object (1).

11. A method as in claim 10, including arranging rigid masts capable of operating tensionally and compressively between the object (1) and the poles of the external envelope (10) following the destruction of the connecting balloon (2) and of the inner envelope (8) and after the external envelope has been made rigid.

12. A method as in claim 8, and wherein an envelope is deployed around an orbiting object.

13. An apparatus for deploying an airtight envelope around an object (1) comprising a container (13) to be fastened to said object (1) and holding a connecting mast (2) having one end (4) rigidly joined to the container and being designed for two end positions comprising a collapsed position wherein it is collapsed inside the container (13), an extended position wherein it extends outside the container (13), a first inner cylindrical envelope (8) having one pole (9) solidly joined to the container and one pole (3) solidly joined to the end of the connecting mast (2), said inner envelope being accordion-pleated within the container (13) in an inverted position, a second external envelope (10) partly slipped around the inner envelope (8) before same is being pleated, and having an open annular pole solidly joined to the peripheral wall of said inner envelope and a pole (3) solidly joined to the end of the connecting mast (2), and inflating means to allow consecutive inflation of the inner envelope (8) and of the external envelope (10).

14. Apparatus as in claim 13, and wherein the connecting mast (2) comprises a substantially cylindrical, generally elongated balloon enclosed by a grid of circumferential reinforcements (5).

15. Apparatus as in claim 14, and wherein the inflation means include: feed means to consecutively inflate the connecting balloon (2) and the inner and outer envelopes (8) and (10) respectively, means monitoring the relative pressure of the connecting balloon (2) and designed to stop the inflation of said balloon and to actuate the inflation of the inner envelope (8) at a relative pressure of the connecting balloon (2) exceeding a given reference value.

16. Apparatus as in claim 13, and wherein said cylindrical inner envelope (8) is enclosed by a grid of circumferential reinforcements (15), said inner envelope having a circumferential reinforcement zone (11) away from its two poles (3, 9) so as to allow fastening the annular pole of the external envelope (10).

17. Apparatus as in claim 13, and wherein said external envelope (10) includes two outer walls.

* * * * *